United States Patent [19]

Perry

[11] Patent Number: 4,643,647
[45] Date of Patent: Feb. 17, 1987

[54] ROTOR AEROFOIL BLADE CONTAINMENT

[75] Inventor: Derick A. Perry, Derby, England

[73] Assignee: Rolls-Royce plc, London, England

[21] Appl. No.: 790,201

[22] Filed: Oct. 22, 1985

[30] Foreign Application Priority Data

Dec. 8, 1984 [GB] United Kingdom ............. 8431058

[51] Int. Cl.[4] ............................................. F01D 5/14
[52] U.S. Cl. ............................ 416/230; 416/241 A; 416/239
[58] Field of Search ............. 416/218, 2, 223 A, 224, 416/228, 229 R, 229 A, 230, 233, 239, 241 A, 248

[56] References Cited

U.S. PATENT DOCUMENTS

| 3,737,250 | 6/1973 | Pilpel et al. | 416/248 X |
| 3,756,746 | 9/1973 | Baker | 416/230 |
| 3,762,835 | 10/1973 | Carlson et al. | 416/230 X |
| 4,098,559 | 7/1978 | Price | 416/248 X |
| 4,108,572 | 8/1978 | Platt | 416/230 |
| 4,260,332 | 4/1981 | Weingart et al. | 416/230 X |
| 4,381,960 | 5/1983 | Pinter et al. | 416/230 X |

FOREIGN PATENT DOCUMENTS

| 924248 | 2/1955 | Fed. Rep. of Germany | 416/239 |
| 1291718 | 10/1972 | United Kingdom | 416/230 |

Primary Examiner—Robert E. Garrett
Assistant Examiner—Joseph M. Pitko
Attorney, Agent, or Firm—Cushman, Darby & Cushman

[57] ABSTRACT

A hollow propfan aerofoil blade is provided with grooves which extend between its root and tip portions. The grooves contain filaments which are enclosed within a resin matrix material and are anchored to the root and tip portions. The filaments are arranged to be of sufficient strength to contain any of aerofoil portion of the blade in the event of any structural failure thereof.

11 Claims, 7 Drawing Figures

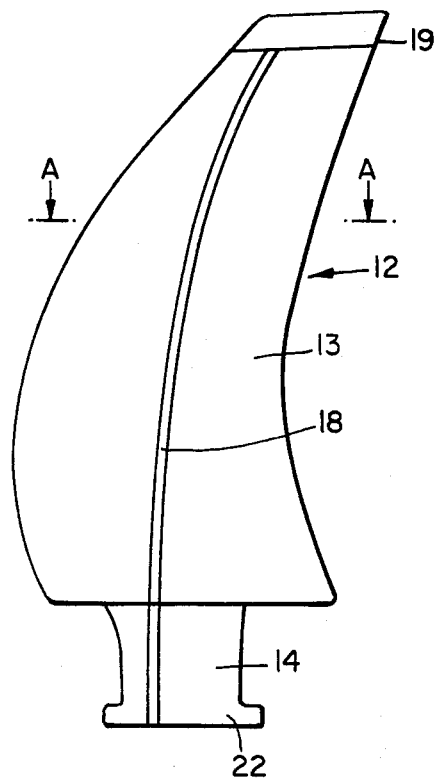
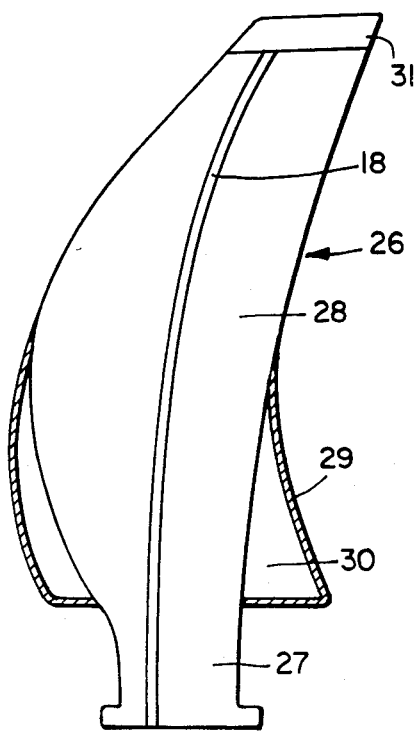
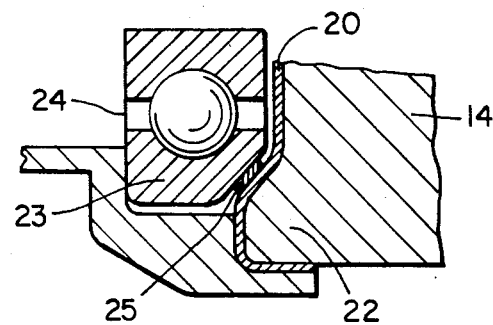

ROTOR AEROFOIL BLADE CONTAINMENT

This invention relates to rotor aerofoil blades and in particular to the containment of rotor aerofoil blades in the event of a structural failure thereof.

Rotor aerofoil blades, such as fan blades for ducted fan gas turbine engines and propeller blades for piston engines and turboprop gas turbine engines, are conventionally solid structures. This brings advantages in terms of blade integrity and cost but is not conducive with weight reduction and consequent improvements in operating efficiency. The quest for weight reduction has led to an interest in hollow aerofoil blades. Particular interest has been expressed in hollow fan blades and the so-called propfan blades for use respectively in the ducted and non-ducted fans of gas turbine engines. While hollow aerofoil blades provide a desirable decrease in weight, they also provide integrity problems. In the event of the failure of a hollow aerofoil blade through, for instance, impact by a bird or other foreign object, there is a great danger of part or all of the blade becoming detached from its mounting structure and causing damage to surrounding structures. If the aerofoil blade is in the form of a fan blade for a ducted fan gas turbine engine, detached blade portions can be contained by the casing which surrounds the fan. However the casing must be sufficiently strong to serve this purpose and is consequently generally heavier than it would need to be if it did not provide containment. Moreover the casing would not protect the engine itself from the effects of a detached blade portion passing into it. The situation with propeller blades and propfan blades is even more serious in view of the lack of a surrounding containment structure.

It is an object of the present invention to provide a rotor aerofoil blade which has improved integrity and which therefore is less of a hazard to surrounding structure in the event of a structural failure thereof.

According to the present invention, a rotor aerofoil blade comprises an aerofoil cross-section portion having concave and convex flanks, a tip portion and a root portion at the opposite end thereof to said tip portion which root portion is configured for the attachment of said blade to a rotatable hub member, said aerofoil cross-section portion having at least one groove in each of its concave and convex flanks, each of said grooves extending between said tip and root portions and containing a plurality of filaments, each of which is anchored to said tip and root portions, said filaments being enclosed within a matrix material and of sufficient strength to contain any of said aerofoil cross-section portion in the event of any structural failure of said aerofoil cross-section portion.

The invention will now be described, by way of example, with reference to the accompanying drawings in which:

FIG. 2 is a side view of one of the rotor aerofoil blades of the propfan shown in FIG. 1.

FIG. 6 is a sectioned side view of a part of the root portion of the rotor aerofoil blade shown in FIG. 2 and a part of the rotatable hub member to which it is attached.

FIG. 7 is a partially sectioned side view of an alternative form of rotor aerofoil blade in accordance with the present invention.

Figure 1:
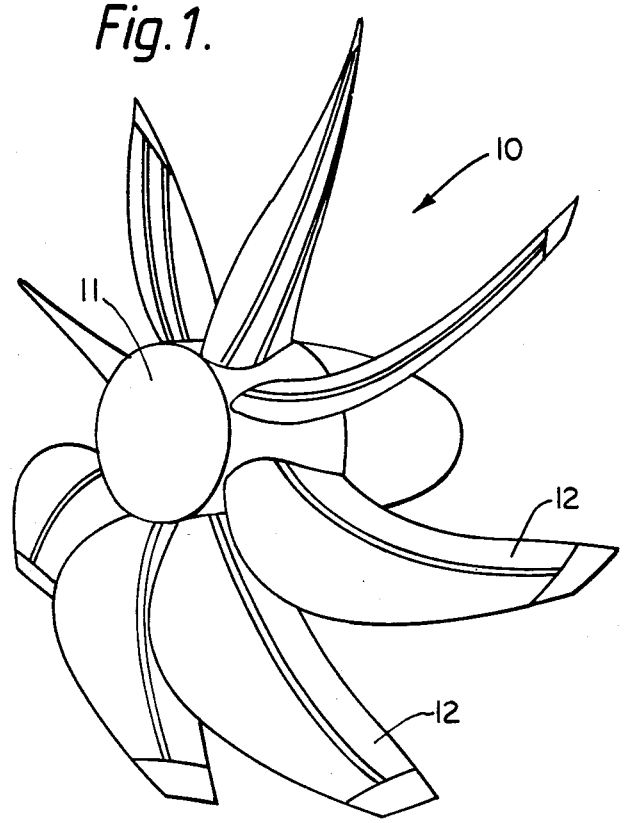
FIG. 1 is a view of a propfan which incorporates a number of rotor aerofoil blades in accordance with the present invention.

With reference to FIG. 1, a propfan generally indicated at 10 is adapted for aft attachment to a gas turbine engine (not shown). It will be understood however that the present invention is equally applicable to fore mounted propfans. The propfan 10 comprises a rotatable hub member 11 upon which is mounted a plurality of radially extending equally spaced apart rotor aerofoil blades 12. Each rotor aerofoil blade 12, are of which can be seen more clearly in FIG. 2, comprises an aerofoil cross-section portion 13, and at its radially inner extent, a conventionally shaped root portion 14 to facilitate its attachment to the rotatable hub member 11. Although the rotor aerofoil blade 12 is in the form of a propfan blade, it will be appreciated that the present invention is not specifically restricted to propfan blades, but is equally applicable to other rotor aerofoil blades such as fan blades and propeller blades.

Figure 3:
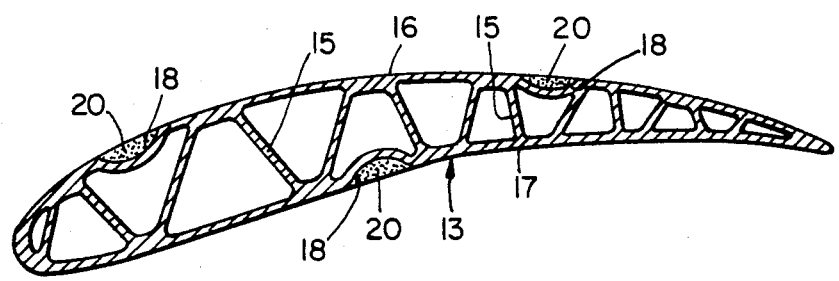
FIG. 3 is a view on section line A—A of FIG. 2.

The aerofoil cross-section portion 13 of the blade 12 is, as can be seen in FIG. 3, hollow. A plurality of webs 15 interconnect the inner surfaces of the convex and concave flanks 16 and 17 of the aerofoil cross-section portion in order to provide the blade 12 with the necessary degree of strength.

Figure 4:
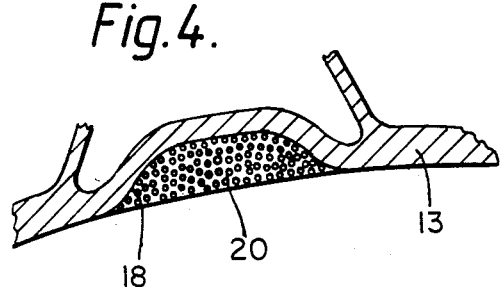
FIG. 4 is an enlarged view of a portion of the view shown in FIG. 3.
Figure 5:
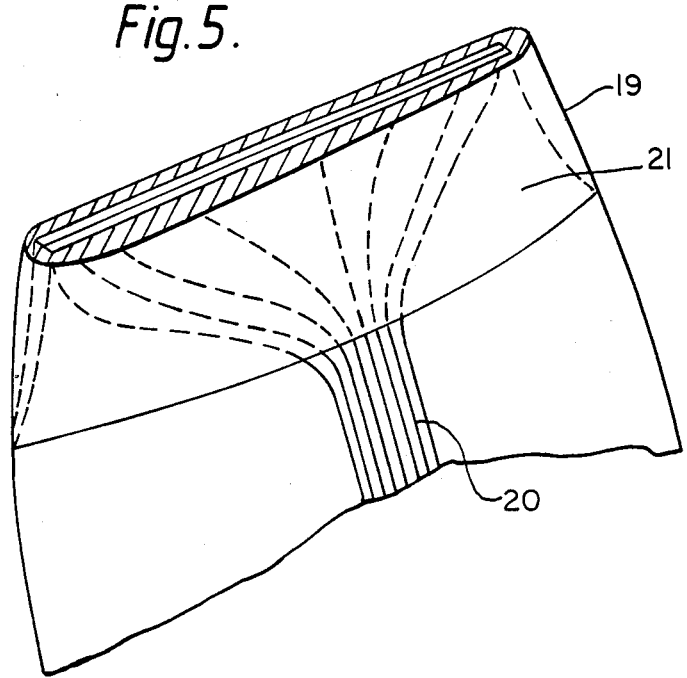
FIG. 5 is a partially sectioned view of the tip portion of the rotor aerofoil blade shown in FIG. 2.

The convex and concave flanks 16 and 17 are respectively provided with two and one generally radially extending grooves 18 in their outer surfaces. The grooves 18 extend from the tip portion 19 of the aerofoil blade 12 to its root portion 14. Each groove 18 contains a bundle of aramid filaments 20 which are available under the name "Kevlar" from Du Pont. Each bundle of filaments 20 is enclosed within an epoxy resin matrix as can be seen in FIG. 4 so that the resin surface is flush with the blade flank surfaces 16 and 17. Each of the filaments 20 extends from the blade tip portion 19 to its root portion 14. The blade tip portion 19, which can be seen more clearly in FIG. 5, is enclosed by an epoxy resin cap 21 which is bonded thereto. The aramid filaments 20 in the region of the blade tip 19 are splayed out and embedded within the epoxy resin cap 21 so that the cap 21 provides a point of anchorage of the filaments 20 to the blade tip portion 19. The other ends of the filaments 20, which can be seen in FIG. 6 extend over an enlarged retention feature 22 provided on the blade root 14 so as to be interposed between the retention feature 22 and the radially inner race 23 of a bearing 24 which constitutes a part of the rotatable hub member 11. A ring 25 acts as a load transference member between the filaments 20 and the inner bearing race 23. It will be seen therefore that the rotatable hub member 11, in addition to retaining the blade root 14, serves to clamp the filaments 20 in position on the root 14, thereby anchoring the filaments 20 to the blade root 14.

During normal operation of the rotor aerofoil blades 12, the filaments 20 are essentially passive so far as performing a load bearing function is concerned. However the major role of the filaments 20 comes about in the event of any structural failure of the aerofoil cross-section portion 13 of the blade 12. If such structural failure results in one or more pieces of the aerofoil cross-section portion 13 becoming detached from the remainder of the blade 12, the filaments 20 serve to contain the detached piece or pieces and thereby prevent damage to surrounding structures. This being so, the filaments 20 must be chosen so as to ensure that they are of sufficient strength to perform this function if so called upon.

As stated previously the propfan 10 is intended for mounting at the aft end of a gas turbine engine and as such, may be subject, at least in part, to impingement by the hot gas efflux from the engine. The temperatures that these gases reach in practice are so high as to bring about the thermal degradation of the filaments 20 and the resin matrix within which they are enclosed. In such circumstances it is desirable to provide shielding of those areas of the blade 12 which are liable to encounter high temperature exhaust gases. In FIG. 7 there is depicted a rotor aerofoil blade 26 in accordance with the present invention which is provided with such shielding.

The rotor aerofoil blade 26 like the aerofoil blade 12, is provided with a root portion 27 for the attachment of the blade 26 to the rotatable hub member 11. However, unlike the aerofoil blade 12, the aerofoil cross-section portion 28 of the aerofoil blade 26 is partially defined by an appropriately shaped metallic shield 29. The shield is mostly spaced apart from the remainder of the blade 26 so that a gap 30 is defined between them. The gap 30, which may be fed with cooling air, acts as a thermal insulation layer between the hot exhaust efflux gases of the engine upon which the blade 26 is mounted and those portions of the blade 26 which are prone to thermal degradation. The blade 26 is otherwise similar in construction to the previously described aerofoil blade 12 in that it is hollow and provided with containment filaments 20 which, in operation, are anchored to the blade root portion 27 and blade tip portion 31. However that portion of the aerofoil cross-section blade portion 28 which is enclosed by the metal shield 29, since it is not directly exposed to the airstream passing over the aerofoil blade 26, is narrower than the corresponding portion of the aerofoil blade 12 in order to define the gap 30.

It is envisaged that it may be desirable in certain circumstances to provide a thin metal sheath around the blade root portions 14 and 27. Such a metal sheath would protect the filaments 20 in the region of the root portions 14 and 27 from thermal degradation as well as providing an improved load path for the filaments 20 and protect the root portions 14 and 27 from foreign object damage.

Although the present invention has been described with reference to rotor aerofoil blades having aramid filaments 20, alternative filaments or even wire could be utilised if desired. Precautions would have to be taken in choosing alternative filaments in order to ensure that they are of sufficient strength to contain any detached aerofoil blade portion.

I claim:

1. A rotor aerofoil blade comprising and aerofoil cross-section portion having concave and convex flanks, a tip portion and a root portion at the opposite end thereof to said tip portion which root portion is configured for attachment of said blade to a rotatable hub member, said aerofoil cross-section portion having at least one groove in each of said concave and convex flanks, each said groove extending spanwise between said tip portion and said root portion and containing a plurality of spanwise extending filaments, means anchoring said spanwise extending filaments to said tip portion and said root portion, a matrix enclosing said spanwise extending filaments in each said groove and having a flush surface with said flanks, and said spanwise extending filaments in said matrix being essentially passive in performing a load-bearing function during normal operation but having sufficient strength to contain any of said aerofoil cross-section portion in the event of any structural failure of said aerofoil cross-section portion.

2. A rotor aerofoil blade as claimed in claim 1, wherein said filaments are operationally anchored to said root portion by arranging for a portion of said filaments to extend over said root portion and clamping said filaments between said root portion and the rotatable hub member to which said root portion is operationally attached.

3. A rotor aerofoil blade as claimed in claim 1 wherein said aerofoil cross-section portion is provided with three of said grooves, two of which are in one of the flanks of said aerofoil cross-section portion and the other in the remaining flank of said aerofoil cross-section portion.

4. A rotor aerofoil blade as claimed in claim 1 wherein at least part of said aerofoil cross-section portion adjacent said root portion is constituted by a metal shield, at least a part of which shield is thermally insulated from the remainder of said blade.

5. A rotor aerofoil blade as claimed in claim 4 wherein said at least part of said metal shield is thermally insulated from the remainder of said blade by air.

6. A rotor aerofoil blade as claimed in claim 1 wherein said filaments are formed from an aramid.

7. A rotor aerofoil blade as claimed in claim 1 wherein said matrix material within which said filaments are enclosed is a resin.

8. A rotor aerofoil blade as claimed in claim 7 wherein said resin is an epoxy.

9. A rotor aerofoil blade as claimed in claim 1 wherein said tip portion of said blade is defined by a resin cap, said filaments being embedded within said resin cap so as to be anchored thereto.

10. A rotor aerofoil blade as claimed in claim 1 wherein said blade is hollow.

11. A rotor aerofoil blade as claimed in claim 1 wherein said blade is a propfan blade.

* * * * *